United States Patent
Ciciriello et al.

(10) Patent No.: US 11,645,436 B2
(45) Date of Patent: May 9, 2023

(54) MODE-SHAPED COMPONENTS

(71) Applicant: Rolls-Royce Deutschland Ltd & Co KG, Blankenfelde-Mahlow (DE)

(72) Inventors: Lucia Ciciriello, Potsdam (DE); Luca Fontana, Berlin (DE); Tomasz Grubba, Zeuthen (DE)

(73) Assignee: ROLLS-ROYCE DEUTSCHLAND LTD & CO KG, Blankenfeld-Mahlow (DE)

( * ) Notice: Subject to any disclaimer, the term of this patent is extended or adjusted under 35 U.S.C. 154(b) by 204 days.

(21) Appl. No.: 16/868,723

(22) Filed: May 7, 2020

(65) Prior Publication Data

US 2020/0372192 A1 Nov. 26, 2020

(30) Foreign Application Priority Data

May 21, 2019 (EP) .................................. 19 175 620

(51) Int. Cl.
| | |
|---|---|
| G06F 30/23 | (2020.01) |
| G06F 111/20 | (2020.01) |
| G06F 119/02 | (2020.01) |
| G06F 119/22 | (2020.01) |
| G06F 30/25 | (2020.01) |
| G06F 30/27 | (2020.01) |
| G06F 111/00 | (2020.01) |
| G06F 30/20 | (2020.01) |

(52) U.S. Cl.
CPC .............. *G06F 30/23* (2020.01); *G06F 30/20* (2020.01); *G06F 30/25* (2020.01); *G06F 30/27* (2020.01); *G06F 2111/00* (2020.01); *G06F 2111/20* (2020.01); *G06F 2119/02* (2020.01); *G06F 2119/22* (2020.01)

(58) Field of Classification Search
CPC .. G06F 30/23; G06F 2111/20; G06F 2119/02; G06F 30/20; G06F 30/25; G06F 30/27; G06F 30/28; G06F 2111/00; G06F 2119/22
See application file for complete search history.

(56) References Cited

U.S. PATENT DOCUMENTS

| | | | |
|---|---|---|---|
| 6,542,859 B1 * | 4/2003 | Burns .................. | G06F 30/23 703/2 |
| 7,280,950 B2 * | 10/2007 | Heilenbach ............ | G01M 7/00 415/160 |

(Continued)

FOREIGN PATENT DOCUMENTS

GB 2490127 A 10/2012

OTHER PUBLICATIONS

European Search Report dated Nov. 29, 2019 from counterpart European App No. 19175620.4.

*Primary Examiner* — Kibrom K Gebresilassie
(74) *Attorney, Agent, or Firm* — Shuttleworth & Ingersoll, PLC; Timothy Klima

(57) ABSTRACT

Embodiments of the invention are shown in the figures, where a method is presented for designing a component, including designing or receiving a model of the component; determining at least one mode shape of at least a portion of the model; redesigning the model based on the determined at least one mode shape to obtain a redesigned model of the component; and manufacturing the component in accordance with the redesigned model.

10 Claims, 7 Drawing Sheets

(56) References Cited

U.S. PATENT DOCUMENTS

| | | | | |
|---|---|---|---|---|
| 8,209,839 | B1* | 7/2012 | Brostmeyer | F01D 5/005 |
| | | | | 703/2 |
| 8,713,511 | B1* | 4/2014 | Clark | G06F 30/30 |
| | | | | 716/136 |
| 11,280,751 | B2* | 3/2022 | Ruggiero | F01D 5/005 |
| 2002/0017144 | A1* | 2/2002 | Miles | G01N 3/32 |
| | | | | 73/808 |
| 2005/0096891 | A1* | 5/2005 | Simpson | F01D 5/141 |
| | | | | 703/7 |
| 2010/0314028 | A1* | 12/2010 | Hedges | B29C 70/083 |
| | | | | 156/93 |
| 2011/0042839 | A1* | 2/2011 | Tanimura | G01M 11/0257 |
| | | | | 264/2.2 |
| 2016/0098499 | A1* | 4/2016 | Heirman | G06F 30/20 |
| | | | | 703/2 |
| 2018/0038382 | A1 | 2/2018 | Foster et al. | |
| 2018/0314767 | A1* | 11/2018 | Cochrane | G06F 30/00 |
| 2021/0342501 | A1* | 11/2021 | Carpenter | G06F 30/20 |

* cited by examiner

MODE-SHAPED COMPONENTS

This application claims priority to European Patent Application EP19175620.4 filed May 21, 2019, the entirety of which is incorporated by reference herein.

The present disclosure relates to a method for designing a component, to a method for manufacturing a component, and to a component.

A common problem, in particular in the field of rotating machinery, is controlling the level of vibration. Vibration may be caused by imbalances of components of the machinery, such as, e.g., a shaft, compressor and turbine discs and blades in gas turbine engines, and also external forcing such as, e.g., aircraft maneuvers and aerodynamic forces in an aircraft with the gas turbine engine. Damping systems such as fluid dampers are commonly employed to reduce vibrations.

Vibrations are specifically pronounced at particular rotational speeds and/or frequencies, known as "critical" speeds, in view of resonances of the rotating system. At the critical speeds systems commonly vibrate in resonance, a condition at which vibrations are sustained by the system internal vibratory response determined by the designed stiffness, inertia and damping. The damping system is commonly designed such that its capabilities are not exceeded in use. In many cases the damping system and other components, such as a supporting structure, correspondingly have a relatively high weight. In many fields however, for example, aerospace, weight is an important consideration.

It is an object to reduce vibrations with a lightweight component design.

According an aspect there is provided a method for manufacturing a component. The method comprises designing or receiving a model of the component (e.g., a 3d-CAD model); determining, e.g., by computer simulation, at least one mode shape of the model; redesigning the model based on the determined at least one mode shape to obtain a redesigned model of the component; and manufacturing the component in accordance with the redesigned model.

This is based on the finding that a vibrational response of a component may particularly effectively be reduced by adapting the geometry of the component to one or more of the mode shapes it has without the modification.

The method provides a component design that allows to reduce vibration in resonance by means of variating the distribution of stiffness and/or mass at one or more components (e.g., of an engine), following the paths that are defined by one or more of its mode shapes.

Given a certain object or structure, e.g. an engine component, a mode shape (defined by an eigenvector) corresponds to the characteristic deformation pattern at which the component vibrates when a correspondent natural frequency (defined by an eigenvalue) is excited in resonance. In addition to resonances, which are commonly unwanted conditions during operation, aircraft engines repeatedly undergo vibration excited by transient loads such as aircraft maneuvers, speed regulations or control systems interactions, which might be repeated several time per flight, causing fatigue and a eventually loss of the engine structural integrity.

The mode shapes of a mechanical arrangement completely define the free and forced response of a mechanical system, being the free vibratory response defined a linear combination of mode shapes (Eq. 1), which depends on the boundary conditions (e.g., initial deformation and velocity).

$$Y_i(t) = \Sigma_i A_i \sin \omega_i t - \varphi_i \qquad \text{Eq. 1}$$

A peculiar property of the mode shapes is the orthogonality with respect to the mass and stiffness matrixes of the mechanical arrangement (e.g., a component or a sub assembly).

$$\int_{-\frac{T}{2}}^{\frac{T}{2}} A_i \sin \omega_i t \cdot A_j \sin \omega_j t \, dt = \begin{matrix} 0 & \text{if } i \neq j \\ 1 & \text{if } i = j \end{matrix} \qquad \text{Eq. 2}$$

The property of the mode shape orthogonality that is defined by Eq. 2 implies that the product of two different mode shapes over a period of the vibration is always equal to zero. In the physical domain of the vibration this represents the antagonism between two different mode shapes that cannot coexist at the same time.

In fact, when the initial deformation of an unforced system is given reproducing one of the mode shapes, the response at the other mode is, as the peculiar inertia and stiffness equilibrium cannot take place at the same time. Hence the transient vibration takes place at the frequency of the mode shape that has been used for the initial excitation.

Similarly, if a mode shape deformation is forced into the component by means of design, the other modes shapes can be advantageously disrupted, with the benefit of reducing critical vibration in a broad speed range.

The Finite Element Modal Analysis is a calculation that can be carried out on engine subsystems and components in order to obtain their natural frequencies (eigenvalues) and correspondent mode shapes (eigenvectors). The characteristic vibratory response of a component includes a complex deformation that is a linear combination of its mode shapes, each one vibrating on at its own frequency. When, in the example of an engine, the engine speed is being variating and a resonance condition, or critical speed, is hit, the deformation of the component that generates vibration becomes coincident with the mode shape correspondent to the natural frequency that is being excited, as determined by the connections with the other engine components.

The model may be redesigned in accordance with a pattern of the at least one mode shape. For example, the model is redesigned so that a stiffness and/or mass distribution follows the particular deformation pattern of the at least one mode shape.

The at least one mode shape may be a non-critical mode shape. Optionally, one mode shape (e.g., a non-critical mode shape) is selected out of a plurality of mode shapes. The selected mode shape may be one that is able to disrupt the vibration due to one or more critical mode shapes excited in resonance.

Determining one or more mode shapes of the component may be performed outside of a normal operating range of an operating condition of the component. This may comprise determining vibrational frequencies experienced in an operating range of the component. The operating condition may be a speed of an engine, wherein the component is a part of the engine. The operating condition may alternatively be a frequency of an excitation of the component (which, in turn may depend of an engine speed).

Redesigning the model can be performed so as to adjust a stiffness of the component in accordance with the at least one out-of-operating-range mode shape. It is possible to reduce or eliminate vibrations and/or critical harmonics, at several speeds e.g. of a gas turbine having the component, within the operating range. It has been found that by taking into account mode shapes outside of operational ranges, the vibrational response of components within their operational range may be tuned so that potentially critical mode shapes within the operational range may be effectively disrupted.

Redesigning the model may comprise modifying a geometry and/or a mass distribution of the component and/or the choice of a material of the component. For example, the shape and/or material thickness may be adapted to the at least one mode shape.

Redesigning the model may also comprise modifying a stiffness, in particular a global stiffness and/or a local stiffness.

The stiffness can be modified in a simple way by adding or removing reinforcement and/or by opportunely modifying the shape of the existing surface.

The method optionally further comprises checking that a vibrational response of the component within an operating range is reduced after the redesigning, in particular below a predetermined threshold. If this is not the case, the method may repeat the step of determining a mode shape and/or of redesigning the model.

The method optionally further comprises iteratively performing the steps of determining and/or redesigning and/or checking several times, e.g., two, three, four, five or more times.

Optionally, the component is selected from a plurality of components before the model of this component is redesigned (in particular before the model of the component is designed). For example, the component is selected from a plurality of components of a gas turbine by determining one or more components of the gas turbine which produce(s) vibration and/or critical harmonics by a design failure mode and effects analysis, DFMEA, and/or by a finite element analysis, FEA. Alternatively or in addition, determining one or more mode shapes of the selected model may be performed by DFMEA and/or FEA.

After manufacturing the component or of a plurality of components, the component or the plurality of such components may be mounted at a machine, e.g. at a gas turbine, in particular a gas turbine engine of an aircraft.

According to an aspect, a component manufactured in accordance with the above method is provided. As a result, the shape of the component corresponds to a mode shape, e.g. with alternating local variations of the shape and/or stiffness.

The component may particularly be a component of a gas turbine engine, in particular of a power gearbox thereof, driven by a compressor via a shaft. For example, the component is a ring gear mounting, in particular of such a power gearbox. Vibrations may be particularly difficult to reduce in such gearboxes, in particular vibrations of the ring gear mounting. By designing and manufacturing particularly the ring gear mounting in accordance with the methods described herein, it is possible to substantially decrease vibrations and the weight of the ring gear mounting (and, eventually, also further components). This may increase the lifetime of the power gearbox and/or the time between two maintenances.

According to an aspect, a gas turbine, in particular a gas turbine engine for an aircraft is provided, which comprises one or more components as described herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

For a dynamical system, a mode is a standing wave state of excitation, in which all parts of the system will be affected sinusoidally under a specified fixed frequency. A mode of vibration is characterized by a modal frequency and a mode shape. Given a certain component (in particular a certain engine component), a mode shape corresponds to a characteristic deformation at which the component vibrates when one of its natural frequencies is excited. The vibratory response of the component corresponds to a linear combination of all mode shapes.

Figure 1:
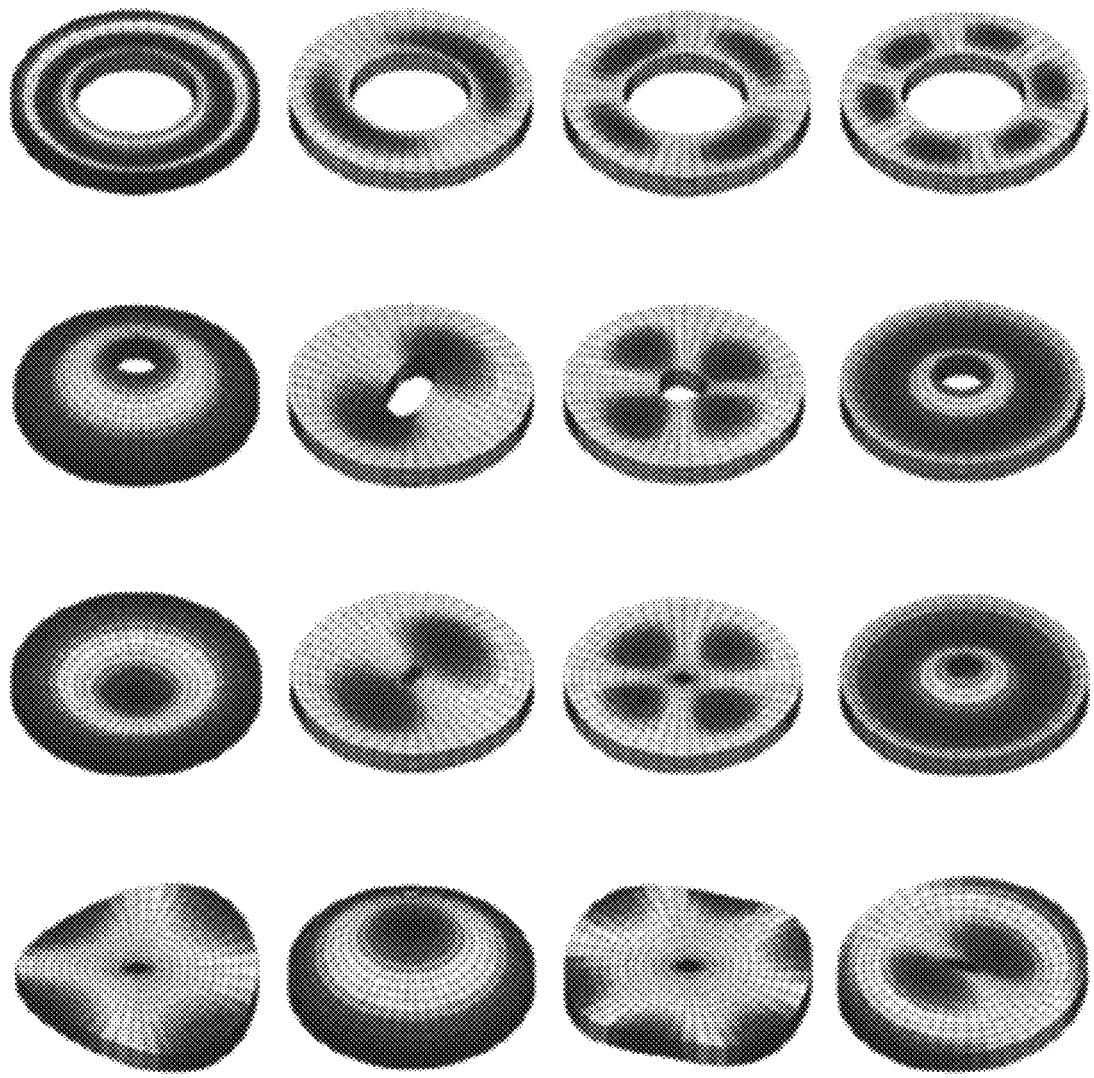
FIG. 1 shows various mode shapes for components with basic circular geometries.

FIG. 1 shows in four rows examples of different components generally having the shape of a disc. The different columns each show the excitation of a certain mode of vibration, wherein the corresponding mode shapes are indicated.

Referring to the first row showing a component in the form of a disc with a hole in the middle as an example, the first mode has a mode shape comprising a symmetric U-shaped deformation. The second mode has a mode shape with two upward deformations and two downward deformations (i.e., each two maxima and minima). The third mode has a mode shape with four maxima and minima, the mode shape shown in the fourth column of the first row has each six maxima and minima.

According to aspects described herein, a component, such as one of the components shown in FIG. 1, may be redesigned in accordance with one or more of the mode shapes. As a result, the response of the component at other frequencies and thus the overall strength of vibrations of the component may be reduced. Due to eigenvalues orthogonality and Fourier theory applied to system dynamics, a possibility to polarize a system response is based on the idea to force the deformation of a structure to assume a shape similar to one of its mode shapes.

Figure 2:
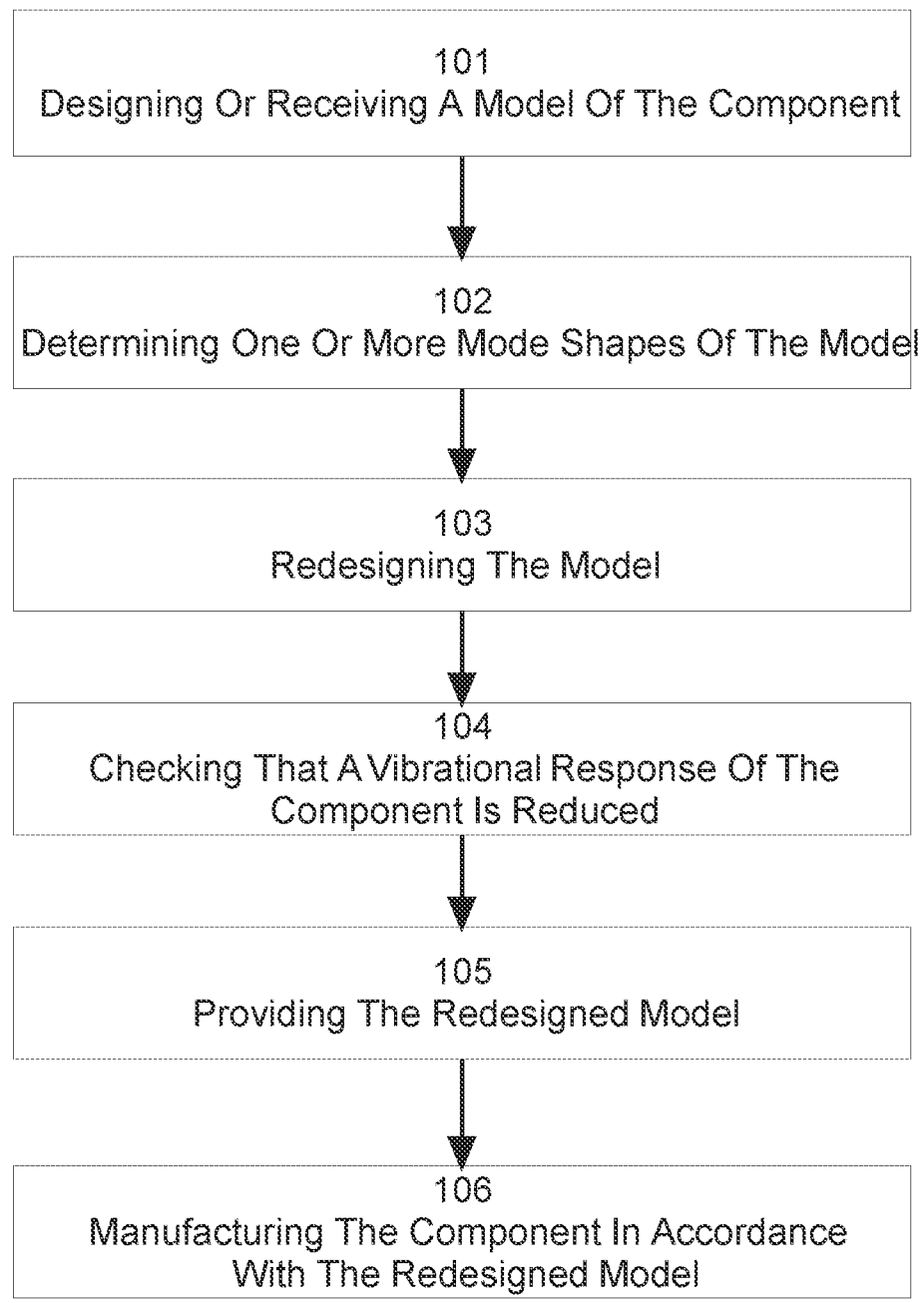
FIG. 2 is a method for designing and manufacturing a component.

FIG. 2 shows a method 100 for designing and manufacturing a component. The method comprises the following steps:

Step 101: designing or receiving a model of the component. The model may be a geometric representation of the component, e.g. in the form of a CAD drawing. The model may be specifically designed or retrieved, e.g., from a database.

Step 102: determining one or more mode shapes of the model. This may comprise performing a finite elements modal analysis. The mode shape may be a non-critical mode shape. The component may be adapted to operate at a predetermined operating range of a given parameter, such as the frequency of an excitation. In gas turbines, for example, a shaft may rotate at a specific range of speeds, wherein the rotation of the shaft may excite a vibration of the component. The determination of the mode shape may be made at values of the parameter outside the operating range (and therefore unlikely to be excited during operation of the machine having the component).

Step 103: redesigning the model based on the determined at least one mode shape (e.g., one mode shape or a combination of several mode shapes) to obtain a redesigned model of the component. This may comprise modifying the geometry and/or other parameters of the model. In particular, redesigning the model may be based on a pattern of the at least one mode shape. This can be done by adjusting a stiffness of the component in accordance with the at least one (e.g., out of operating range) mode shape. As an example, redesigning the model may comprise modifying the geometry and/or mass distribution defined by the model. Optionally, redesigning the model comprises modifying a stiffness defined by the model. The stiffness may be modified by adding or removing a reinforcement structure, e.g., a rib and/or locally increased thickness, and/or by a local hardening of the material. Purely by way of example, it may be found that for the component shown in the first row of FIG. 1, the operating range comprises frequencies and intensities that lead to the first, second and third modes. The third mode, e.g., may be found to be a critical mode (e.g., potentially leading to increased wear and/or reduced lifetime). The fourth mode may be found to be outside the operating range and non-critical. The model of the component may be redesigned so as to have the form described by the fourth mode shape. This may disturb the vibrational response of the component in such a way that the third mode becomes no longer critical under the same operating conditions as before. Indeed, a plurality of critical mode shapes may be addressed at the same time by providing the redesigned, modified component geometry.

Step 104: Checking that a vibrational response of the component is reduced, e.g., within the operating range. This may include the comparison of a parameter of the vibrational response with a predetermined threshold. When it is determined at step 104 that the vibrational response is reduced, e.g., to a predetermined extend, the method continues to step 105. Otherwise, it can optionally repeat steps 102 to 104 at least one time, e.g., iteratively.

Step 105: providing the redesigned model. As an example, the model may be provided in the form of computer-readable instructions being indicative for the geometry of the component. The computer-readable instructions may be provided to a manufacturing machine or the like.

Step 106: manufacturing the component in accordance with the redesigned model. This may be done by means of a machine that received the redesigned model.

Figure 3:
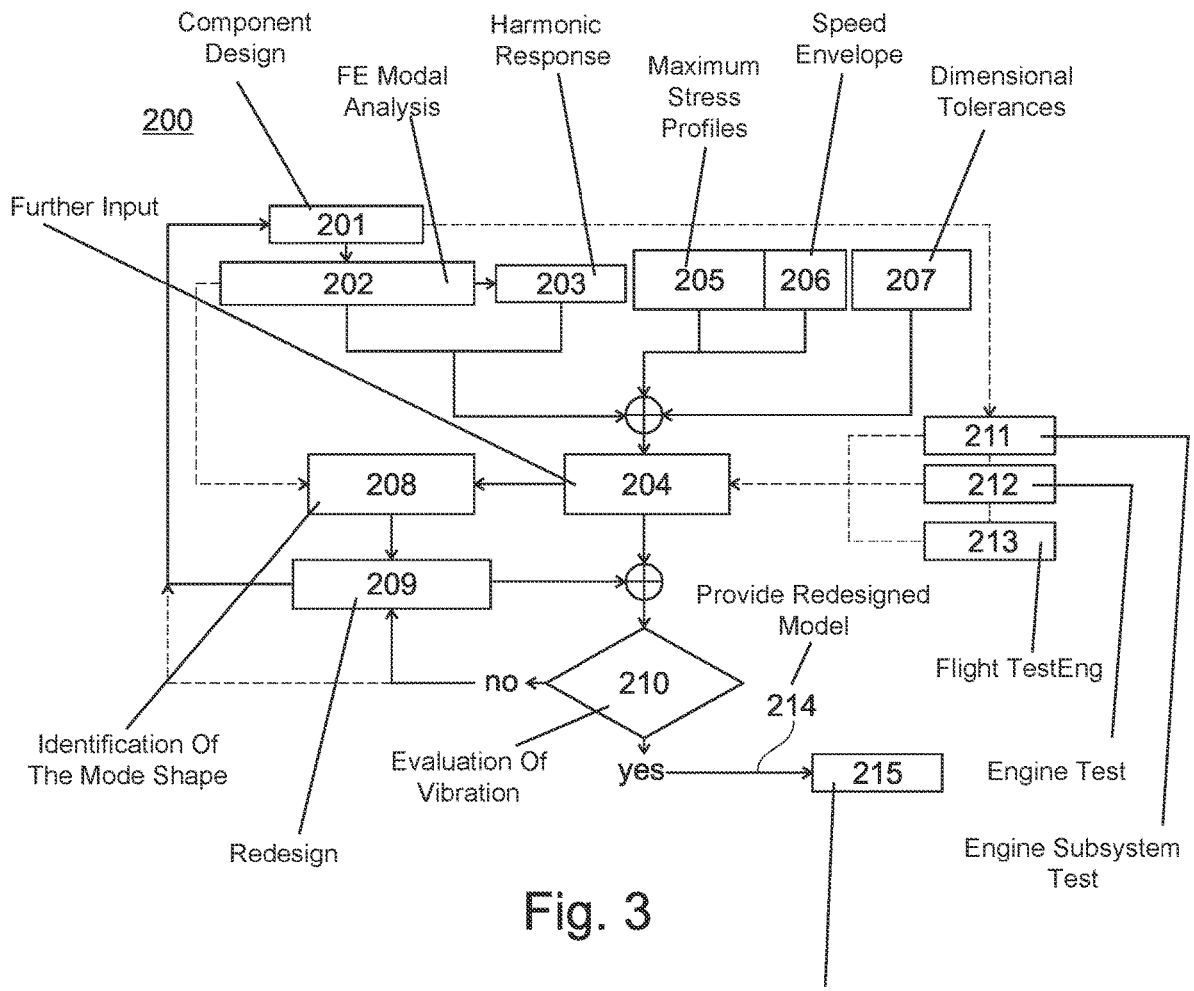
FIG. 3 is a method for designing and manufacturing a component.

FIG. 3 shows a method 200 to design and manufacture a component.

The method 200 starts at step 201 (component design). At step 201, a component is designed by providing, designing or otherwise creating a model of the component. The model may comprise a set of definitions that characterize the physical properties, in particular the geometry of the component to be manufactured.

The model is provided to a finite elements modal analysis performed at step 202 (FE modal analysis to determine mode shapes and natural frequencies). Therein the modal analysis may determine mode shapes and natural frequencies of a component having the design of the model. This may be performed by a computer.

At optional step 203 (harmonic response), a harmonic response is determined, e.g., by a harmonic response analysis.

At optional step 205 (maximum stress profiles), maximum stress profiles may be determined and/or provided, e.g. a maximum stress profile of the component to be manufactured. At further optional step 206 (speed envelope), a speed envelope, e.g., of a gas turbine for which the component is to be manufactured for (and during a flight), may be determined and/or provided. At further optional step 207 (dimensional tolerances), dimensional tolerances of the component to be manufactured and/or of adjacent components in the engine are determined and/or provided.

The results of the analyses at steps 202 and, optionally 203, and, optionally, the outcome of steps 205, 206 and/or 207 are provided to a critical mode shapes identification at step 204. Therein, a mode shape may be determined to be critical when it creates or potentially leads to a critical resonance, e.g. having a destructive effect on the component or adjacent components in the engine (or, in general, machine).

Further input to the critical mode shapes identification at step 204 may be provided as test results from tests in steps 211 (engine subsystem test), 212 (engine test) and/or 213 (flight test, in particular for a retrofit).

At steps 202 and 203, computer simulations may be applied. For example, a design failure mode and effects analysis, DFMEA, and/or a finite element analysis, FEA. Steps 211 to 213 may provide hardware-based tests that are performed based on a given component design, represented by the model provided in step 201 (or step 101 in FIG. 1).

Based on some of, or all of the results provided, at step 204, critical mode shapes are identified.

The mode shape(s) on which to variate the geometry of the component may be identified upon conjoint consideration of an operational speed range and the identification of critical mode shapes that require to be eliminated, or reduced to a maximum extent. The mode shape chosen for altering the geometry may be a non-critical one, out of range and able to mismatching the geometrical periodicities expected to excite resonances during operation. In addition, the mode shape for the stiffness paths may be chosen in order to optimize the disruption of other critical mode shapes at other frequencies.

In case that critical mode shapes are identified at step 204, the method proceeds to step 208. At step 208 (identification of the mode shape for modal stiffening), a mode shape to be used for a mode-shape specific component stiffening is identified. To this end, the results or a subset of the results of the performance of step 202 may be provided to be used at step 208.

The identified mode shape (e.g., as shown in the first row, third column of FIG. 1), is then provided to a mode-shaped design application at step 209. Therein, the component design, i.e., the model of the component, is redesigned (modified) so as to at least partially follow the form of the mode shape. An excitation of the mode shape (e.g., a maximum deflection) may be translated to or "frozen" in the redesigned model of the component.

The redesigned model and the outcome of step 204 are provided and analyzed at step 210 (vibration reduced to target evaluation). At step 210, it is evaluated whether or not the vibration of the component according to the redesigned model in response to a given excitation meets a given target, e.g., is reduced so as to be below a predefined threshold.

When this is the case, the redesigned model is provided (indicated as 214), for manufacturing the component in accordance with the redesigned model at step 215 (manufacturing).

If, however, the target is not met, the method may return to step 209 (and from there either to step 201 or to step 210) or to step 201.

Figure 4A:
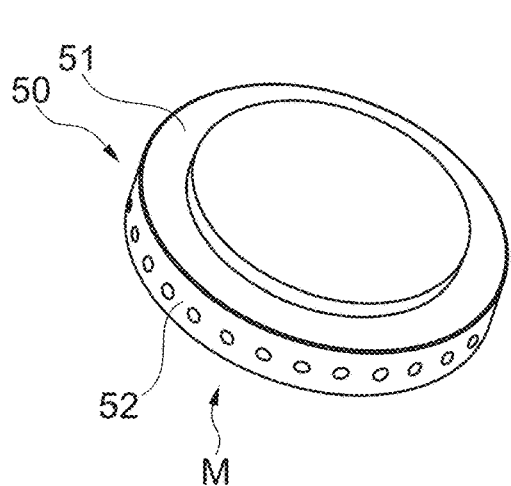
FIGS. 4A to 4C show a component without excitation (FIG. 4A), with excitation of a mode shape (FIG. 4B) and a cross section of FIG. 4B (FIG. 4C)
Figure 4B:
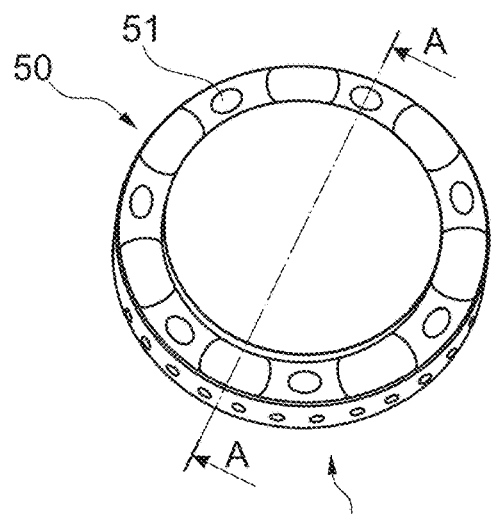
Figure 4C:
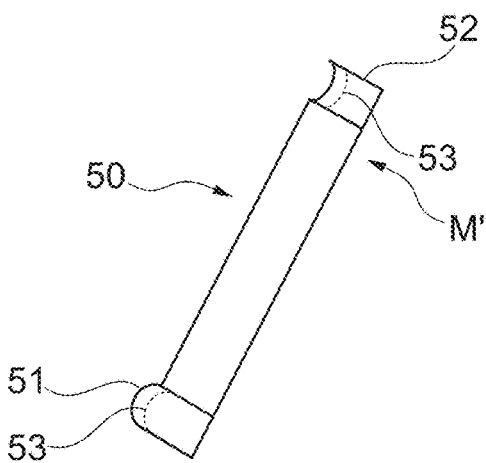

FIGS. 4A to 4C show geometries of two versions of a component 50, in the present example a ring gear front diaphragm, having a disc portion 51 and a cylindrical portion 52. FIG. 4A shows the component 50 in accordance with a model M. The model M is provided at step 101 or 201 of the method 100; 200 of FIG. 2 or 3. The method 100 of FIG. 2 or the method 200 of FIG. 3 is then performed, wherein a redesigned model M' is created. The component 50 is manufactured in accordance with the redesigned model M'. This is shown in FIGS. 4B and 4C, wherein it becomes apparent that a portion of the model M', in this example, an outer ring section of the disc portion 51, has been modified with respect to the original model M such that it assumes the pattern of a mode shape of the component 50. In the example of FIGS. 4B and 4C, the outer ring section is periodically bent inwards and outwards (in a 7-nodal diameter mode shape). The surface of the outer ring section follows the mode shape deformation of the unmodified component (see FIG. 4A).

FIG. 4C shows an optional way of stiffening portions in accordance with a mode shape by adding one or more reinforcements 53 in a pattern that corresponds to the mode shape (indicated by dashed lines). The reinforcements 53 may be formed as stiffening ribs and/or local thickness variations. Another option is to arrange a composite material (or portions thereof) along the mode shape.

Figure 5A:
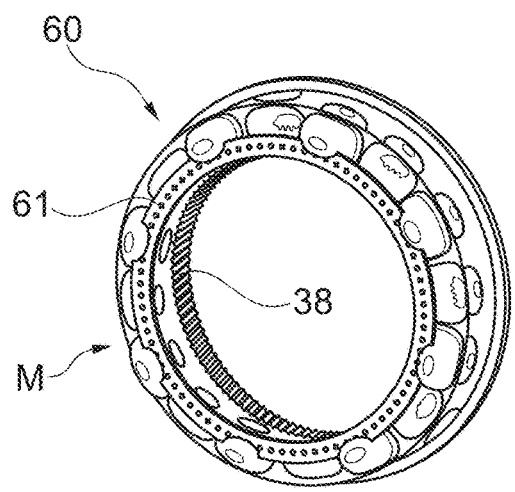
FIGS. 5A and 5B show a component in the form of a ring gear mount without excitation (FIG. 5A) and with excitation of a mode shape (FIG. 5B)
Figure 5B:
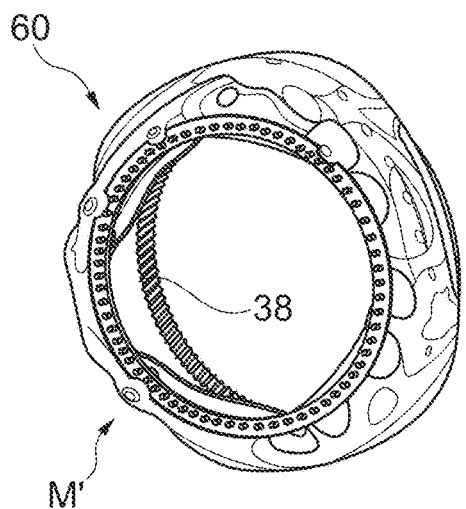

FIGS. 5A and 5B show two versions of another component 60. This component 60 is a ring gear mount for mounting a ring gear 38 of a gearbox of a gas turbine engine to a stationary structure of the gas turbine engine by means of a flange 61. The gas turbine engine, gearbox and ring gear 38 will be described in greater detail below with reference to FIGS. 6 to 8.

FIG. 5A shows the component 60 designed in accordance with a model M that has not yet been tuned on a mode shape, and excited in an operating range of frequencies and intensities. Local deformations are very pronounced and lead to stresses on the component 60 which may reduce its lifetime. The mode shape is a critical 8-diameter mode shape.

FIG. 5B shows a version of the component 60 manufactured in accordance with the method 100; 200 of FIG. 2 or 3 (in accordance with a redesigned model M') at the excitation as shown in FIG. 5A. Stresses are more smoothly distributed over the component 60, so that it can withstand the stresses more stably. Thus, the lifetime of the component 60 according to the redesigned model M' may be increased. Alternatively or additionally, the weight of the component 60 may be reduced.

It becomes apparent that by means of the method described herein, vibrations of the component can be optimized. Manufacturing a component 50; 60 in accordance with the method 100; 200 allows to reproduce a non-critical mode shape stiffness distribution.

In the methods 100; 200, the whole distribution of stiffness of a non-critical mode shape can be used in order to alter the component stiffness and geometry so that the vibration due other, critical mode shapes cannot take place any longer, even if the natural frequency remains within the operational range.

This can be achieved particularly due to the principle of antagonism between different mode shapes. Stating in simplified words, if a mode shape exists, other mode shapes cannot take place at the same time or are minimized by being disrupted due to the presence of the other, non-critical mode shape. By this, the vibration by critical resonances due to other mode shapes may be damped. The non-critical mode shape becomes dominant at all speed as its stiffness has been "shaped" in the geometry. From the integration of the functional requirements of the component and the stiffness variation along the areas identified by a well-defined mode shape, it is possible to reduce the vibration in the frequency ranges where it is most needed. Thereby, several resonances may be addressed at the same time.

Figure 6:
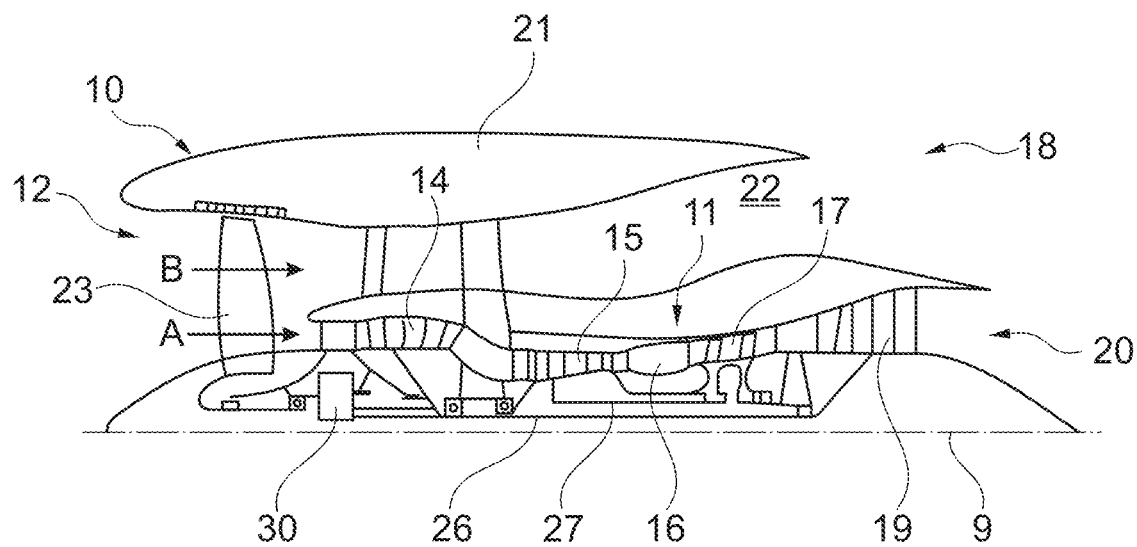
FIG. 6 is a sectional side view of a gas turbine engine.

FIG. 6 illustrates a gas turbine engine 10 for an aircraft. The gas turbine engine 10 has a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 (low-pressure shaft) and an epicyclic gearbox.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27 (high-pressure shaft). The fan 23 generally provides the majority of the propulsive thrust. The epicyclic gearbox 30 is a reduction gearbox.

The gas turbine engine 10 comprises one or more components designed in accordance with the method 100; 200 of FIGS. 2 and/or 3, e.g. a ring gear mount of the gearbox 30.

Figure 7:
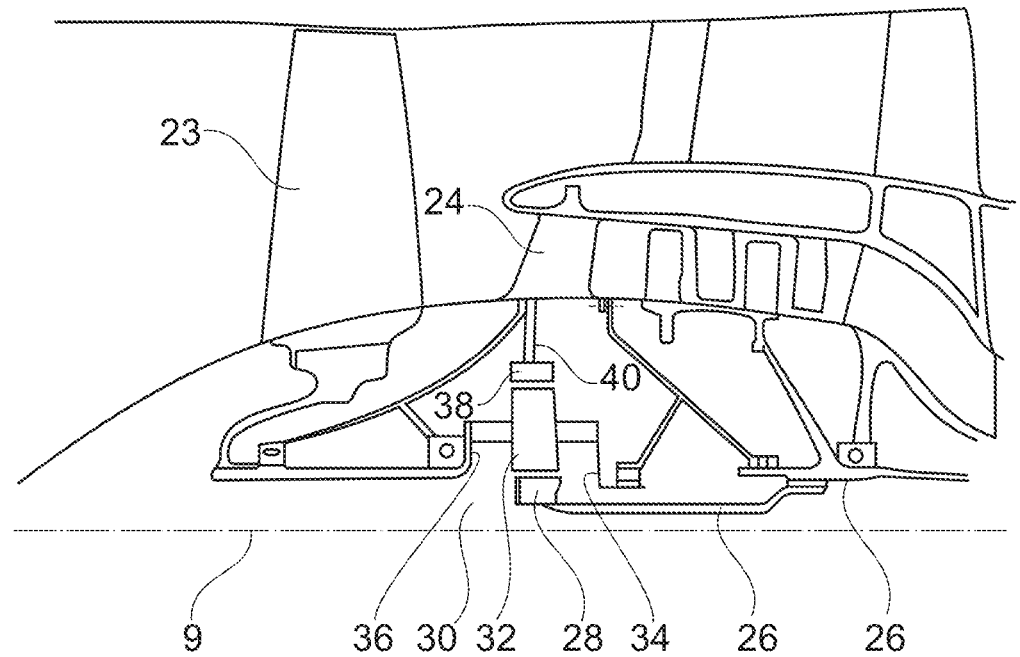
FIG. 7 is a close up sectional side view of an upstream portion of a gas turbine engine.

An exemplary arrangement for a geared fan gas turbine engine 10 is shown in FIG. 7. The low pressure turbine 19 (see FIG. 6) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via the ring gear mount 60 and linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 8:
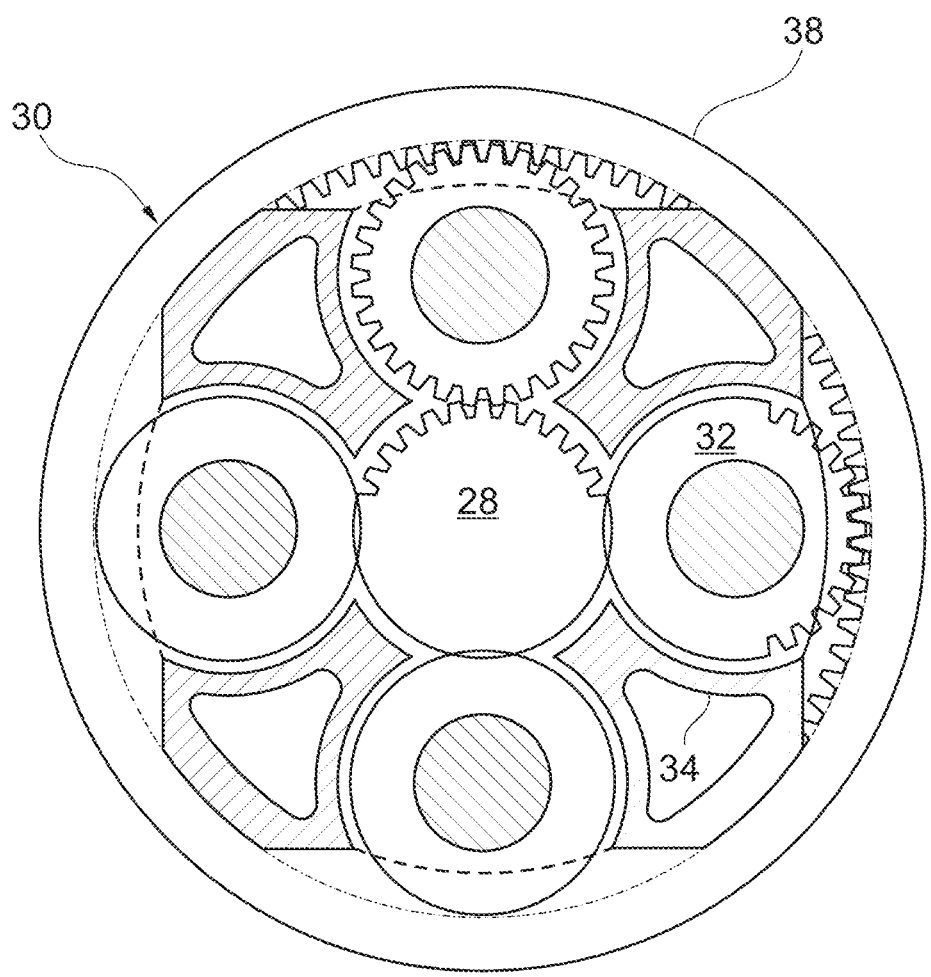
FIG. 8 is a partially cut-away view of a gearbox for a gas turbine engine.

The epicyclic gearbox 30 is shown by way of example in greater detail in FIG. 8. Each of the sun gear 28, planet gears 32 and ring gear 38 comprise teeth about their periphery to intermesh with the other gears. However, for clarity only exemplary portions of the teeth are illustrated in FIG. 8. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 7 and 8 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 7 and 8 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 7 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 7. For example, where the gearbox 30 has a star arrangement (described above), the skilled person would readily understand that the arrangement of output and support linkages and bearing locations would typically be different to that shown by way of example in FIG. 7.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 6 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 6), and a circumferential direction (perpendicular to the page in the FIG. 6 view). The axial, radial and circumferential directions are mutually perpendicular.

Figure 9:
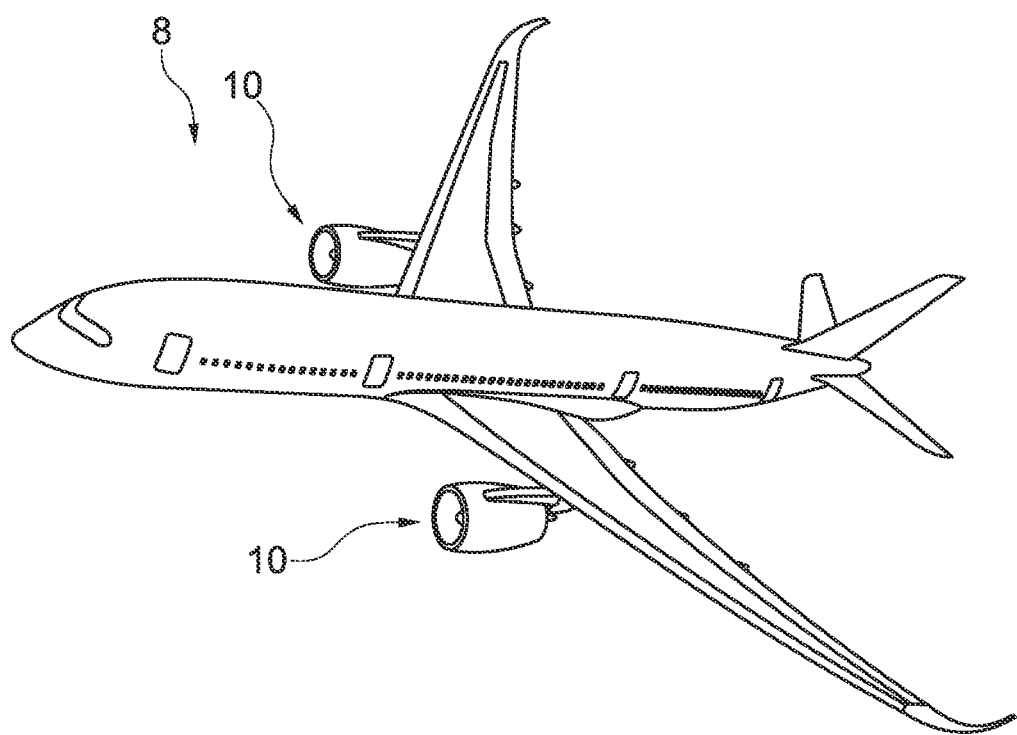
FIG. 9 (Prior Art) is an aircraft having a plurality of gas turbine engines.

FIG. 9 shows an aircraft 8 in the form of a passenger aircraft. Aircraft 8 comprises several (i.e., two) gas turbine engines 10 in accordance with FIGS. 6 to 8.

The identification of the out-of-range mode shape(s) may target the stiffness and mass distributions may result in an effective reduction of the vibration throughout wide gas turbine engine 10 speed ranges where vibrations are deemed to be critical for the engine operation.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, the invention may be applied particularly to components of gas turbines, such as gas turbine engines, and power plants, rigs, engine mounts, large frames, buildings, civil structures, as well as in turbines, pumps, bearings, accessory and power gearboxes and others, but it can also be applied to components of other machines, in particular any type of engine. It is also worth noting that the methods described herein can optionally be used to redesign a component for retrofitting a part, e.g., when it has been found that the part vibrates critically in use.

For aircraft engines, such as gas turbine engines, components particularly suitable for being redesigned as described herein are housings, static structures, struts, vanes and blades. The modification of geometry upon mode-shape patterns may further be combined with the use of composite materials or single crystals (e.g. for blades).

LIST OF REFERENCE NUMBERS 8 airplane
9 principal rotational axis
10 gas turbine engine
11 engine core
12 air intake
14 low-pressure compressor
15 high-pressure compressor
16 combustion equipment
17 high-pressure turbine
18 bypass exhaust nozzle
19 low-pressure turbine
20 core exhaust nozzle
21 nacelle 22 bypass duct
23 propulsive fan
24 stationary support structure
26 shaft
27 interconnecting shaft
28 sun gear
30 gearbox
32 planet gears
34 planet carrier
36 linkages
38 ring gear
40 linkages
50 component
51 disc portion
52 cylindrical portion
53 reinforcement
60 component
61 flange
A core airflow
B bypass airflow
M model
M' redesigned model

The invention claimed is:

1. A method for manufacturing a component, comprising:
designing or receiving a model of the component;
determining at least one mode shape of at least a portion of the model;
redesigning the model based on the determined at least one mode shape to obtain a redesigned model of the component, wherein the model is redesigned in accordance with a deformation pattern of the at least one mode shape so that a stiffness and/or mass distribution follows the deformation pattern;
wherein the determining the at least one mode shape of the component is performed outside of a predetermined operating range with respect to an operating condition of the component;
wherein the redesigning the model is performed to adjust component stiffness in accordance with at least one out of operating range mode shape; and
manufacturing the component in accordance with the redesigned model.

2. The method according to claim 1, wherein the at least one mode shape is non-critical.

3. The method according to claim 1, wherein the redesigning the model comprises modifying a geometry of the model.

4. The method according to claim 1, wherein the redesigning the model comprises modifying the stiffness of the model.

5. The method according to claim 4, wherein the modifying the stiffness is performed by adding or removing a reinforcement.

6. The method according to claim 1, further comprising checking that a vibrational response of the component within an operating range is reduced after the redesigning the model.

7. The method according to claim 6, further comprising iteratively performing the steps of the determining, the redesigning and/or the checking multiple times.

8. The method according to claim 1, wherein before the redesigning the model, selecting the component from a plurality of components by determining a component of a gas turbine which produces vibration harmonics and/or critical harmonics by a design failure mode and effects analysis (DFMEA) and/or a finite element analysis (FEA).

9. The method according to claim 1 and further comprising providing that the component is a component of a gas turbine engine power gearbox.

10. A method for manufacturing a component, comprising:
designing or receiving a model of the component;
determining at least one mode shape of at least a portion of the model;
wherein the at least one mode shape is non-critical;
redesigning the model based on the determined at least one mode shape to obtain a redesigned model of the component, wherein the model is redesigned in accordance with a deformation pattern of the at least one mode shape so that a stiffness and/or mass distribution follows the deformation pattern; and
manufacturing the component in accordance with the redesigned model.

* * * * *